United States Patent
Liu

(10) Patent No.: US 8,531,928 B2
(45) Date of Patent: Sep. 10, 2013

(54) OPTICAL STORAGE APPARATUS AND METHOD FOR AUTOMATICALLY ADJUSTING LOOP GAIN THEREOF

(75) Inventor: Yao-Wen Liu, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 582 days.

(21) Appl. No.: 12/429,194

(22) Filed: Apr. 24, 2009

(65) Prior Publication Data

US 2010/0188943 A1   Jul. 29, 2010

(30) Foreign Application Priority Data

Jan. 23, 2009   (TW) ............................... 98102937 A

(51) Int. Cl.
*G11B 7/00* (2006.01)

(52) U.S. Cl.
USPC ....................................................... 369/47.5

(58) Field of Classification Search
None
See application file for complete search history.

(56) References Cited

U.S. PATENT DOCUMENTS

| | | | |
|---|---|---|---|
| 6,944,109 B2 * | 9/2005 | Wang et al. | 369/53.26 |
| 2002/0105896 A1 * | 8/2002 | Kusumoto et al. | 369/125 |
| 2006/0039261 A1 * | 2/2006 | Tsukamoto et al. | 369/59.11 |
| 2006/0126460 A1 * | 6/2006 | Kobayashi | 369/47.1 |
| 2006/0262683 A1 * | 11/2006 | Chen | 369/47.53 |
| 2007/0195666 A1 * | 8/2007 | Ko et al. | 369/47.5 |
| 2008/0084805 A1 * | 4/2008 | Chen | 369/59.11 |
| 2008/0117750 A1 * | 5/2008 | Hayashi | 369/47.5 |
| 2009/0073827 A1 * | 3/2009 | Hsieh et al. | 369/47.5 |

* cited by examiner

*Primary Examiner* — Joseph Haley
*Assistant Examiner* — Emily Frank
(74) *Attorney, Agent, or Firm* — Jianq Chyun IP Office

(57) ABSTRACT

An optical storage apparatus and a method for automatically adjusting a loop gain thereof are provided. The method includes the following steps. Firstly, a compact disk is written by an erase power. Next, a writing state of the erase power is detected to generate an error signal. Finally, a loop gain of a servo control loop is corrected according to the error signal. Therefore, the loop gain can be corrected by the present invention according to a reflectance of the compact disk.

13 Claims, 5 Drawing Sheets

OPTICAL STORAGE APPARATUS AND METHOD FOR AUTOMATICALLY ADJUSTING LOOP GAIN THEREOF

CROSS-REFERENCE TO RELATED APPLICATION

This application claims the priority benefit of Taiwan application serial no. 98102937, filed on Jan. 23, 2009. The entirety of the above-mentioned patent application is hereby incorporated by reference herein and made a part of specification.

BACKGROUND OF THE INVENTION

1. Field of the Invention

The present invention relates to an optical storage apparatus. More particularly, the present invention relates to a method for automatically adjusting a loop gain of an optical storage apparatus.

2. Description of Related Art

Generally, when a compact disk (CD) is rotated, it may have a vertical and a horizontal radial wobble. Therefore, to maintain the quality of read or write data, and to keep a good response value, an optical storage apparatus can correct gains of a track loop and a focus loop in a servo control loop. Regarding a re-writable compact disk (CD-RW or DVD-RW), when the disk is played, the optical storage apparatus can correct the loop gain of the servo control loop through a read power. When a write operation is performed, the optical storage apparatus can adjust the loop gain according to a ratio between an erase power and the read power.

However, in case of the same erase power, regarding the disks having different reflectance, an error signal obtained by the optical storage apparatus is unnecessarily to be proportional to the erase power. If the loop gain is adjusted according to the ratio between the erase power and the read power, a servo signal and a wobble signal are deviated from their optimal values, which may result in a fact that the loop gain is deviated from its optimal value or the wobble signal exceeds an input range of the servo control loop.

Generally, when the servo loop gain is deviated from its optimal value, a bandwidth of the servo is changed, or stability of the servo is decreased, which may finally lead to a decrease of a write quality or lead to a write failure. Similarly, when the wobble signal exceeds the input range of the servo control loop, a wobble signal quality is decreased, so that jitter amounts of a wobble clock and a write clock are increased, which may also lead to a decrease of the write quality or lead to the write failure.

To resolve the above problem, when an offline test of the optical storage apparatus is performed, an optimal loop gain can be designed to each of the disks. However, since types of the disk are diversified, if the loop gains of the disks are respectively designed, the huge amount of data can lead to excessive data searching time. Moreover, as the disk technique is continually developed, when a novel disk is presented, data update thereof has to be performed, which can increase a complexity of a follow-up processing.

SUMMARY OF THE INVENTION

The present invention is directed to a method for automatically adjusting a loop gain of an optical storage apparatus, by which a gain of a wobble signal can be corrected according to a reflectance of a disk.

The present invention provides a method for automatically adjusting a loop gain of an optical storage apparatus. The method comprises the following steps. First, a disk (CD or DVD) is written by an erase power. Next, a writing state of the erase power is detected to generate an error signal. Finally, a loop gain of a servo control loop is corrected according to the error signal.

The present invention provides an optical storage apparatus comprising a control unit, a power driving unit, an optical pickup head, an actuator, and an analog front end (AFE) device. The control unit has a digital signal processing gain and is used for generating a control signal according to an error signal and a command value. The power driving unit is coupled to the control unit for converting the control signal into a power signal. The optical pickup head is used for performing a write operation to a disk. The actuator is coupled between the power driving unit and the optical pickup head, and is used for controlling the optical pickup head according to the power signal. The AFE device is coupled to the control unit and has a write sensor gain, which is used for detecting a writing state of the optical pickup head, so as to generate the error signal. Wherein, when the optical pickup head writes the disk by an erase power, the optical storage apparatus corrects the digital signal processing gain or the write sensor gain according to the error signal.

The optical storage apparatus of the present invention and the method for automatically adjusting a loop gain thereof can correct the loop gain according to the error signal generated when the disk is written by the erase power. Accordingly, the loop gain can be corrected according to a reflectance of the disk.

In order to make the aforementioned and other objects, features and advantages of the present invention comprehensible, a preferred embodiment accompanied with Figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention provides an optical storage apparatus and a method for automatically adjusting a loop gain thereof, wherein the optical storage apparatus is used for correcting the loop gain during a CD erase process. To fully convey the spirit of the present invention, embodiments are provided below for further description.

Figure 1:
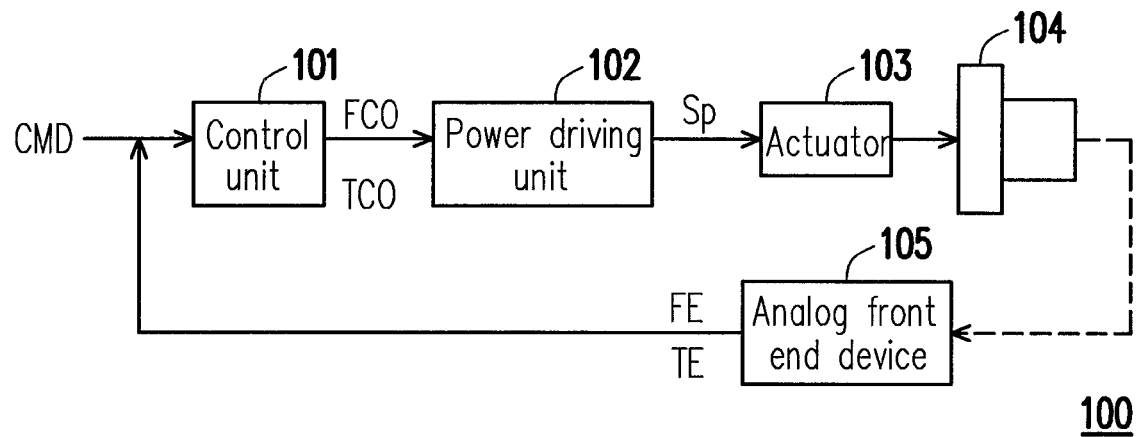
FIG. 1 is a system block diagram illustrating an optical storage apparatus according to an embodiment of the present invention.

FIG. 1 is a system block diagram illustrating an optical storage apparatus according to an embodiment of the present invention. Referring to FIG. 1, the optical storage apparatus 100 includes a control unit 101, a power driving unit 102, an actuator 103, an optical pickup head 104 and an analog front end (AFE) device 105. The control unit 101 has a digital signal processing gain and is used for generating a control signal according to an error signal and a command value CMD. Wherein, the control signal is, for example, a focus error signal FE or a track error signal TE, and the control signal is, for example, a focus control output signal FCO or a track control output signal TCO.

The power driving unit 102 is coupled to the control unit 101 for converting the control signal into a power signal $S_P$. The optical pickup head 104 is used for performing a write operation to a disk, for example, a re-writable (RW) CD or a re-writable DVD, though the present invention is not limited thereto. The actuator 103 is coupled between the power driving unit 102 and the optical pickup head 104, and is used for controlling the optical pickup head 104 according to the power signal $S_P$. The AFE device 105 is coupled to the control unit 101 and has a write sensor gain and a read sensor gain, which is used for detecting a writing state of the optical pickup head 104, so as to generate the error signal, wherein the AFE device 105 can be a combination of a photo-detector integrated circuit (PDIC) and an analog signal amplifier.

Generally, the optical storage apparatus 100 has to track on and focus on the disk to correctly write or read data. Therefore, before data is written or read, loop gains of a track control loop and a focus control loop are corrected, wherein the loop gain is a sum of a sensor gain (for example, the write sensor gain or the read sensor gain), a digital signal processing gain, and a gain of the power driving unit 102 (with a unit of dB). According to a conventional loop gain correction method, the correction is performed in case of an open loop, and the correction is generally performed through a read power.

As described above, the corrected loop gain is used for a read operation of the optical storage apparatus 100. If the loop gain of a write operation that is adjusted according to a power ratio is not an optimal loop gain for the write operation, the loop gain correction has to be performed through an erase power. However, in case of the open loop, the disk cannot be tracked on, and if the loop gain correction is performed through the erase power, the optical pickup head 104 cannot be fixed, and when the optical pickup head 104 is moved to an area with data, the data thereon can be erased. Therefore, the correction performed through the erase power has to be performed in case of a close loop, so as to avoid erasing the original data on the disk.

Regarding the focus control loop, when the optical pickup head 104 writes the disk by the erase power, the AFE device 105 can generate the focus error signal FE, and the optical storage apparatus 100 can correct the digital signal processing gain of the control unit 101, or the write sensor gain of the AFE device 105 of the focus control loop according to the focus error signal FE, and the read sensor gain of the AFE device 105 can be corrected according to the conventional correction method.

The correction method of the track seeking loop is similar as above, by which the AFE device 105 can generate the track error signal TE, and then the digital signal processing gain of the control unit 101, or the write sensor gain of the AFE 105 of the track control loop is corrected according to the track error signal TE. By such means, the optical storage apparatus 100 can respectively correct the loop gains of the focus control loop and the track control loop according to different reflectance of the disk and a power difference during the write operation, so as to increase a stability of the write operation.

Figure 2:
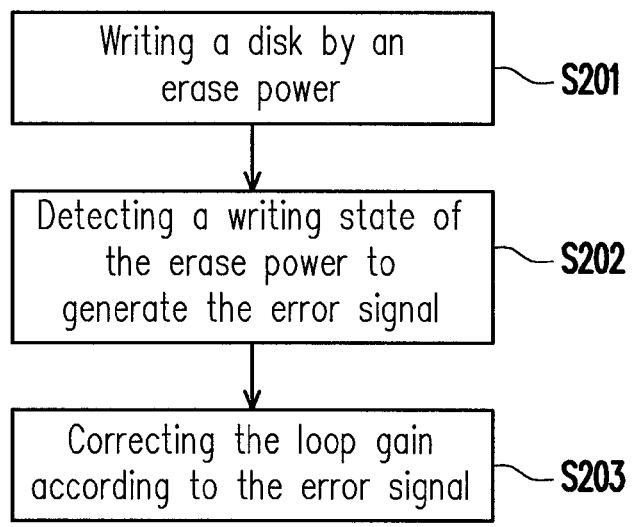
FIG. 2 is a flowchart illustrating a method for automatically adjusting a loop gain of an optical storage apparatus according to an embodiment of the present invention.

According to another aspect, a method for automatically adjusting the loop gain of the optical storage apparatus 100 is provided, and an embodiment is provided below for further description. FIG. 2 is a flowchart illustrating a method for automatically adjusting a loop gain of an optical storage apparatus according to an embodiment of the present invention. Referring to FIG. 2, first, in step S201, the disk is written by an erase power. Next, in step S202, a writing state of the erase power is detected to generate an error signal. Finally, in step S203, a loop gain of a servo control loop is corrected according to the error signal.

For example, regarding the focus control loop, when the optical storage apparatus writes a certain area of the disk by the erase power, a laser light used for the write operation can be reflected to the optical storage apparatus by the disk, by which the writing state of the erase power can be detected. Wherein, such area is, for example, a power calibration area (PCA) or an arbitrary area on the disk.

After the optical storage apparatus receives the reflected laser light, the optical storage apparatus generates the focus error signal according to the received laser light. Now, the optical storage apparatus has to correct the focus loop gain according to the focus error signal, and the correction of the focus loop gain can be achieved by adjusting the digital signal processing (DSP) gain or the write sensor gain of the focus control loop.

Similarly, regarding the track control loop, when the optical storage apparatus writes the disk by the erase power, the optical storage apparatus can generate the track error signal according to the writing state. Correction of the track loop gain can be achieved by adjusting the DSP gain or the write sensor gain of the track control loop.

In case of adjusting the DSP gain, since the servo control loop only has one set of the DSP gain, if the DSP gain is corrected, the loop gain of the optical storage apparatus during the read operation can be influenced.

In case of adjusting the write sensor gain, since the servo control loop has the read and the write sensor gain respectively corresponding to the read operation and the write operation of the optical storage apparatus, after the write sensor gain is corrected, only the loop gain of the write operation is influenced, and the loop gain of the read operation is not influenced. Moreover, if the write sensor gain is corrected, the error signal generated in the servo control loop can be stably maintained.

According to the conventional technique, it is known that to correctly write data, the optical storage apparatus generally performs an optimal power determination before performing the write operation to the disk. During the optimal power determination process, if the determination is performed in allusion to the re-writable disk, an erase operation is performed to the disk, so that the correction of the loop gain can be performed according to the erase process. An embodiment is provided below for further description.

Figure 3:
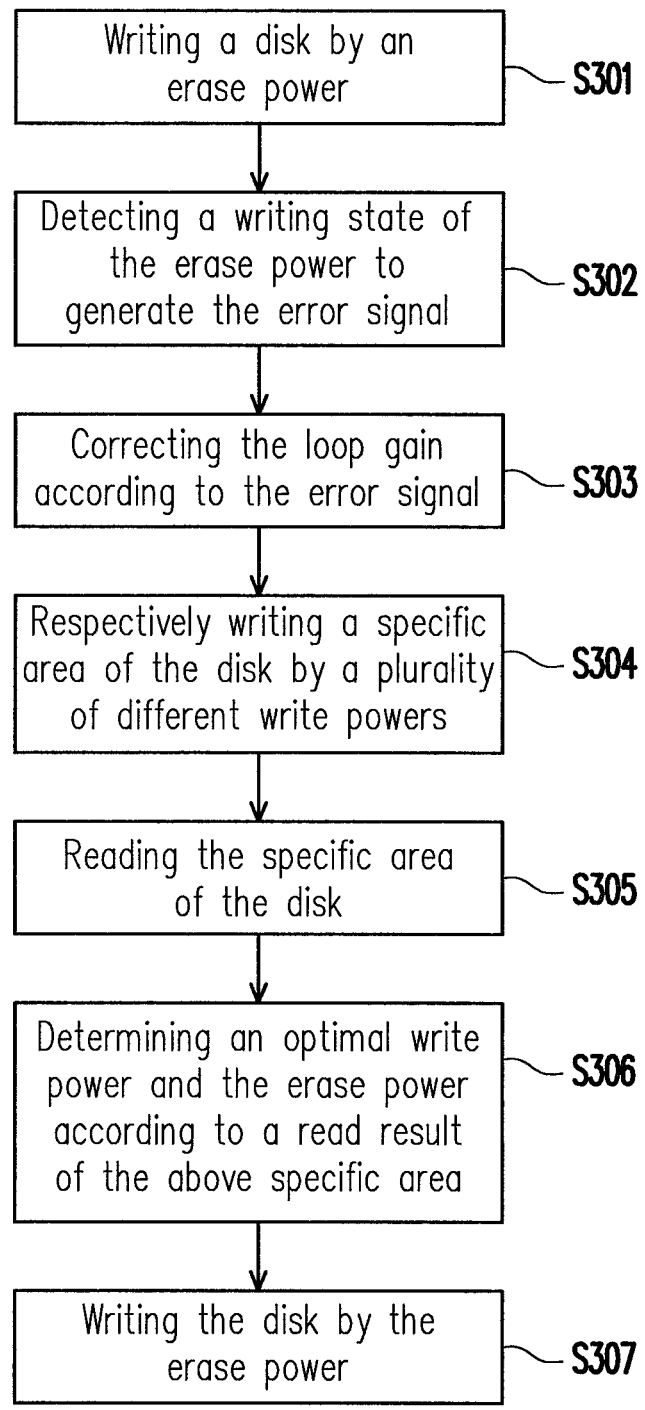
FIG. 3 is a flowchart illustrating a method for automatically adjusting a loop gain of an optical storage apparatus according to an embodiment of the present invention.

FIG. 3 is a flowchart illustrating a method for automatically adjusting a loop gain of an optical storage apparatus according to another embodiment of the present invention. Referring to FIG. 3, first, in step S301, the disk is written by an erase power. Next, in step S302, a writing state of the erase power is detected to generate an error signal. Next, in step S303, a loop gain is corrected according to the error signal. Next, in step S304, a specific area of the disk is respectively written by a plurality of different write powers. Next, in step S305, the specific area of the disk is read, and in step S306, an optimal write power and the erase power are determined according to a read result of the specific area. Finally, in step S307, the disk is again written by the erase power.

For example, before the optical storage apparatus performs the optimal power determination to the re-writable disk, the optical storage apparatus first performs the erase operation to the power correction area, and while the erase operation is performed, the loop gain (for example, the focus loop gain or the track loop gain) is corrected according to the error signal generated when the optical storage apparatus writes the disk by the erase power. Next, the optimal power determination is performed, by which the optimal write power and the optimal erase power are determined according to a read result. Finally, the data written on the disk during the optimal power determination is erased. By such means, the loop gain can be corrected according to the reflectance of the disk to ensure a stability of a later optimal power determination or the data writing operation, and improve an accuracy of the optimal power determination.

It should be noted that in the step S301, trial-writing data generated during the former optimal power determination can be erased, so as to avoid a negative influence on the trial-writing, wherein the so-called negative influence is, for example, an excessive writing power used in the former trial-writing. Since the erased area comprises a trial-writing area of a follow-up optimal power determination, when the trial-writing or the signal reading of the optimal power determination is performed, signal interference of adjacent areas caused by poor tilt or track offset during the former trial-writing can be avoided.

On the other hand, in the step S307, the trial-writing data generated during the present optimal power determination can be erased, so as to avoid a negative influence of the trial-writing, and avoid instability of a later track-seeking performed at the trial-writing area, and avoid obtaining a poor trial-writing signal or a poor reading signal of the next optimal power determination caused by poor writing power, tilt or track offset of the present trial-writing.

Figure 4:
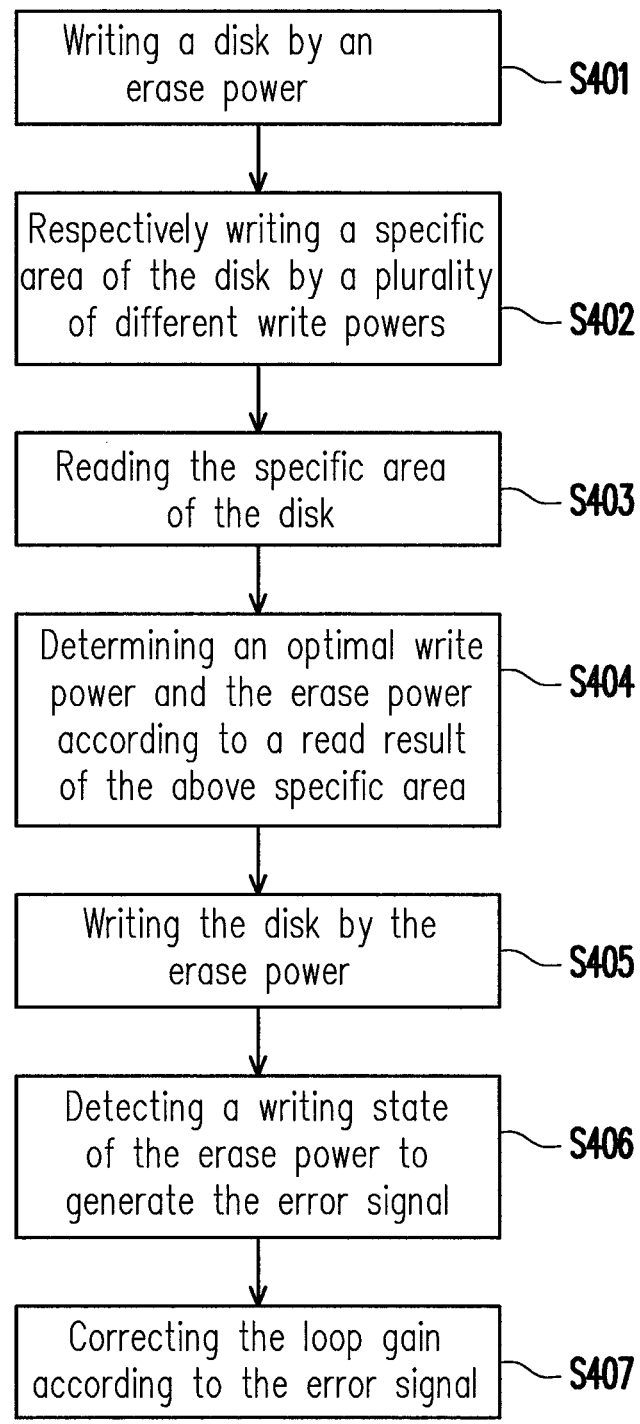
FIG. 4 is a flowchart illustrating a method for automatically adjusting a loop gain of an optical storage apparatus according to an embodiment of the present invention.

Moreover, the correction of the loop gain can also be performed according to the final erase process, and another embodiment is provided below for further description. FIG. 4 is a flowchart illustrating a method for automatically adjusting a loop gain of an optical storage apparatus according to still another embodiment of the present invention. Referring to FIG. 4, first, in step S401, the disk is written by an erase power. Next, in step S402, a specific area of the disk is written by a plurality of different write powers. Next, in step S403, the specific area of the disk is read, and in step S404, an optimal write power and the erase power are determined according to a read result of the specific area. Next, in step S405, the disk is again written by the erase power. Next, in step S406, a writing state of the erase power is detected to generate an error signal. Finally, in step S407, the loop gain is corrected according to the error signal.

For example, when the optical storage apparatus performs the optimal power determination to the re-writable disk, the optical storage apparatus also performs the erase operation to the power correction area, first. Then, the erase operation is performed, by which the optimal write power and the erase power are determined according to a read result. Finally, the data written on the disk during the optimal power determination is erased. While the erase operation is performed, the loop gain (for example, the focus loop gain or the track loop gain) is corrected according to the error signal generated when the disk is written by the erase power. By such means, under the optimal write power, the loop gain can be corrected according to the reflectance of the disk, so as to ensure a stability of a later optimal power determination or the data writing operation.

Figure 5:
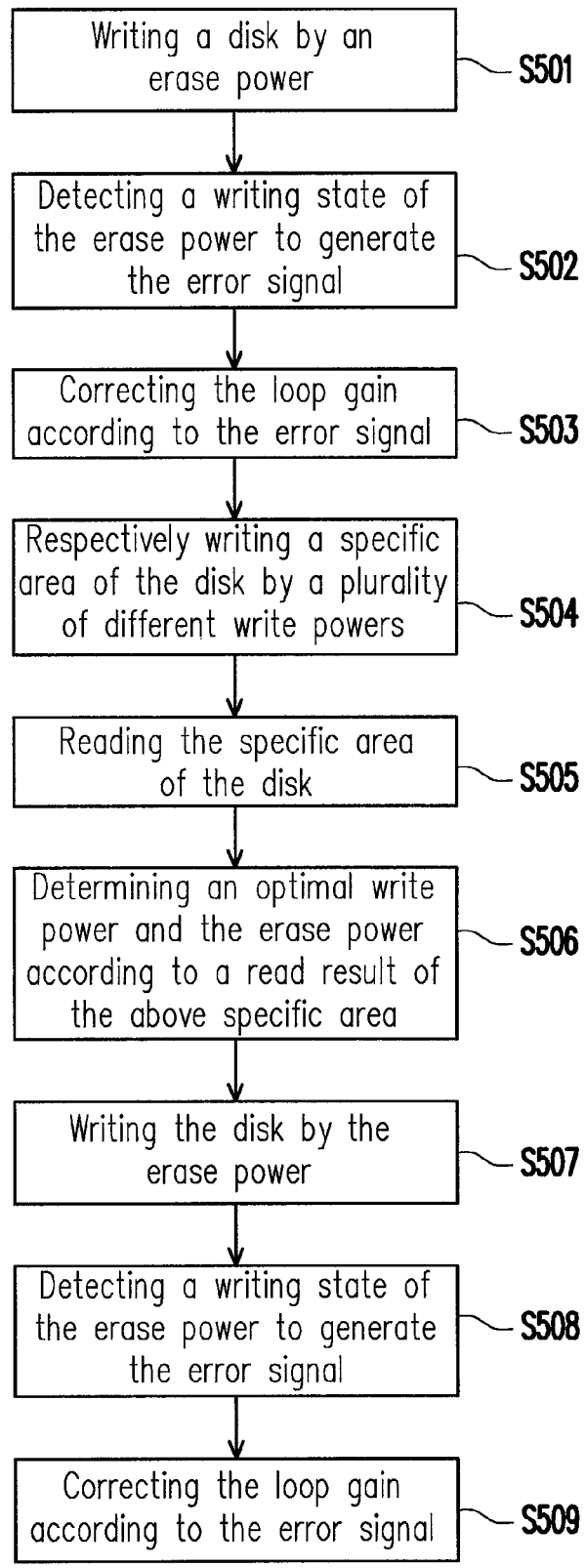
FIG. 5 is a flowchart illustrating a method for automatically adjusting a loop gain of an optical storage apparatus according to an embodiment of the present invention.

According to the above description, the correction of the loop gain can be performed based on the two erase processes of the optimal power determination. Another embodiment is provided below for further description. FIG. 5 is a flowchart illustrating a method for automatically adjusting a loop gain of an optical storage apparatus according to yet another embodiment of the present invention. Referring to FIG. 5, first, in step S501, the disk is written by an erase power. Next, in step S502, a writing state of the erase power is detected to generate an error signal. Next, in step S503, the loop gain is corrected according to the error signal. Next, in step S504, a specific area of the disk is written by a plurality of different write powers. Next, in step S505, the specific area of the disk is read, and in step S506, an optimal write power and the erase power are determined according to a read result of the specific area. Next, in step S507, the disk is again written by the erase power. Next, in step S508, the writing state of the erase power is again detected to generate the error signal. Finally, in step S509, the loop gain is again corrected according to the error signal.

For example, when the optical storage apparatus performs the erase operation to the re-writable disk for the first time, the loop gain (for example, the focus loop gain or the track loop gain) is corrected for the first time according to the error signal generated when the disk is written by the erase power. Next, the optimal power determination is performed, by which the optimal write power and the optimal erase power are determined according to a read result. Finally, data written on the disk during the optimal power determination is erased. When the erase operation is performed for the second time, the loop gain is again corrected according to the error signal generated when the disk is written by the erase power. By such means, not only the loop gain can be corrected according to the reflectance of the disk to ensure a stability of the later optimal power determination or the data writing operation, but also an accuracy of the optimal power determination can be improved, and accordingly an accuracy of the loop gain correction can be improved.

Generally, the re-writable disk has a wobble channel, and the optical storage apparatus can read information stored on the wobble channel, and accordingly the optical storage apparatus can correctly address the disk through the information, so as to correctly read data from the disk or write data into the disk. Therefore, when the loop gain is corrected, a gain of the wobble channel can be simultaneously corrected according to a correction ratio of the loop gain. Another embodiment is provided below for further description.

Figure 6:
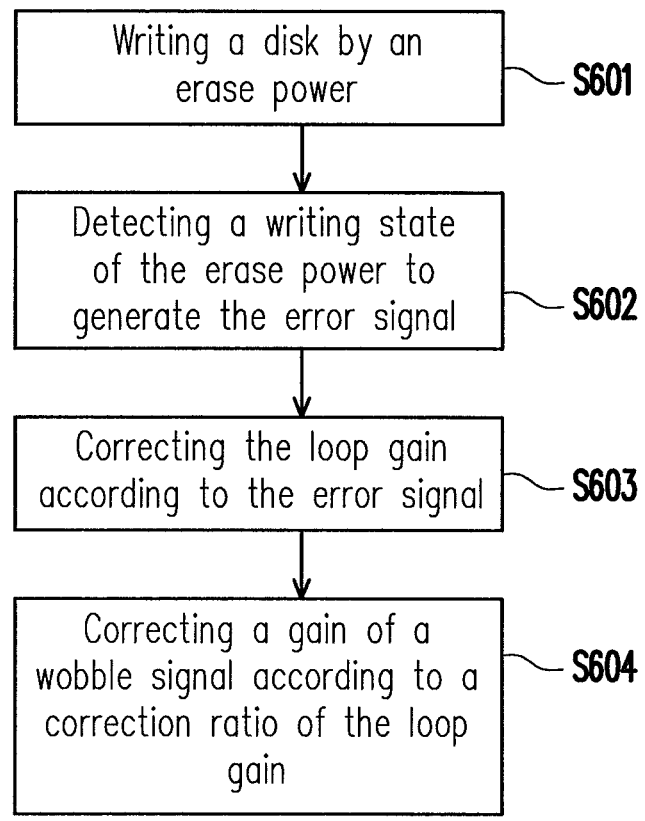
FIG. 6 is a flowchart illustrating a method for automatically adjusting a loop gain of an optical storage apparatus according to an embodiment of the present invention.

FIG. 6 is a flowchart illustrating a method for automatically adjusting a loop gain of an optical storage apparatus according to yet another embodiment of the present invention. Referring to FIG. 6, first, in step S601, the disk is written by an erase power. Next, in step S602, a writing state of the erase power is detected to generate an error signal. Next, in step S603, the loop gain of the servo control loop is corrected according to the error signal. Finally, in step S604, a gain of a wobble signal is corrected according to the correction ratio of the loop gain. Steps 601-603 are similar to the aforementioned steps S201-203, and therefore detailed descriptions thereof are not repeated.

In the step S604, after the focus loop gain or/and the track loop gain is/are corrected, the gain of the wobble channel is further adjusted according to the correction ratio of the focus loop gain or/and the track loop gain. By such means, an input range of the servo control loop or an optimal amplitude of the wobble signal can be met. Or, an amplitude of a wobble channel signal can be directly measured, and the gain of the wobble channel can be adjusted according to the input range of the servo control loop or the optimal amplitude of the wobble signal. By such means, the stability of the wobble signal is improved.

In summary, according to the optical storage apparatus of the present invention and the method for automatically adjusting the loop gain thereof, the loop gain can be corrected during the erase process of the optimal power determination, or the loop gain can be corrected during the other erase processes, and the gain of the wobble channel can be adjusted according to the correction ratio of the loop gain. By such means, the loop gain of the servo control loop can be maintained to a suitable value, and meanwhile a quality of the wobble signal is not varied along with different reflectance of the disk, so as to increase the stability of the data writing operation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for automatically adjusting a loop gain of an optical storage apparatus, the method comprising:
    writing an area of a disk by an erase power so as to erase a trial-writing data generated during a former optimal power determination;
    generating and adjusting an error signal by detecting a writing state of the erase power, wherein the error signal is a focus error signal or a track error signal; and
    correcting a loop gain of a servo control loop according to the error signal.

2. The method as claimed in claim 1, wherein the area is a power calibration area (PCA).

3. The method as claimed in claim 1, wherein when the error signal is the focus error signal, the loop gain is a focus loop gain.

4. The method as claimed in claim 3, wherein the step of correcting the loop gain of the servo control loop comprises:
    correcting a digital signal processing gain or a write sensor gain in the focus loop gain.

5. The method as claimed in claim 1, wherein when the error signal is the track error signal, the loop gain is a track loop gain.

6. The method as claimed in claim 5, wherein the step of correcting the loop gain of the servo control loop comprises:
    correcting a digital signal processing gain or a write sensor gain in the track loop gain.

7. The method as claimed in claim 1, further comprising:
    correcting a gain of a wobble signal according to a correction ratio of the loop gain.

8. The method as claimed in claim 1, further comprising:
    respectively writing a specific area of the disk by a plurality of different write powers;
    reading the specific area of the disk; and
    determining an optimal write power and the erase power according to a read result of the specific area.

9. An optical storage apparatus, comprising:
    a control unit, having a digital signal processing gain, and used for generating a control signal according to an error signal and a command value;
    a power driving unit, coupled to the control unit for converting the control signal into a power signal;
    an optical pickup head, for performing a write operation to a disk;
    an actuator, coupled between the power driving unit and the optical pickup head, and used for controlling the optical pickup head according to the power signal; and
    an analog front end (AFE) device, coupled to the control unit, having a write sensor gain, and used for detecting a writing state of the optical pickup head when the optical pickup head writes the disk by an erase power, so as to generate and adjust the error signal and to erase a trial-writing data generated during a former optimal power determination, wherein the error signal is a focus error signal or a track error signal,
    wherein the digital signal processing gain or the write sensor gain is corrected according to the error signal.

10. The optical storage apparatus as claimed in claim 9, wherein when the error signal is the focus error signal, the control signal is a focus control output signal.

11. The optical storage apparatus as claimed in claim 9, wherein when the error signal is the track error signal, the control signal is a track control output signal.

12. The optical storage apparatus as claimed in claim 9, wherein the disk is a re-writable CD or a re-writable DVD.

13. The optical storage apparatus as claimed in claim 9, wherein the AFE device comprises a photo-detector integrated circuit (PDIC) and an analog signal amplifier.

* * * * *